Sept. 5, 1950
C. L. PETERSON
METHOD AND APPARATUS FOR TREATING
LIQUIDS UNDER VACUUM
Filed Oct. 8, 1945
2,520,957
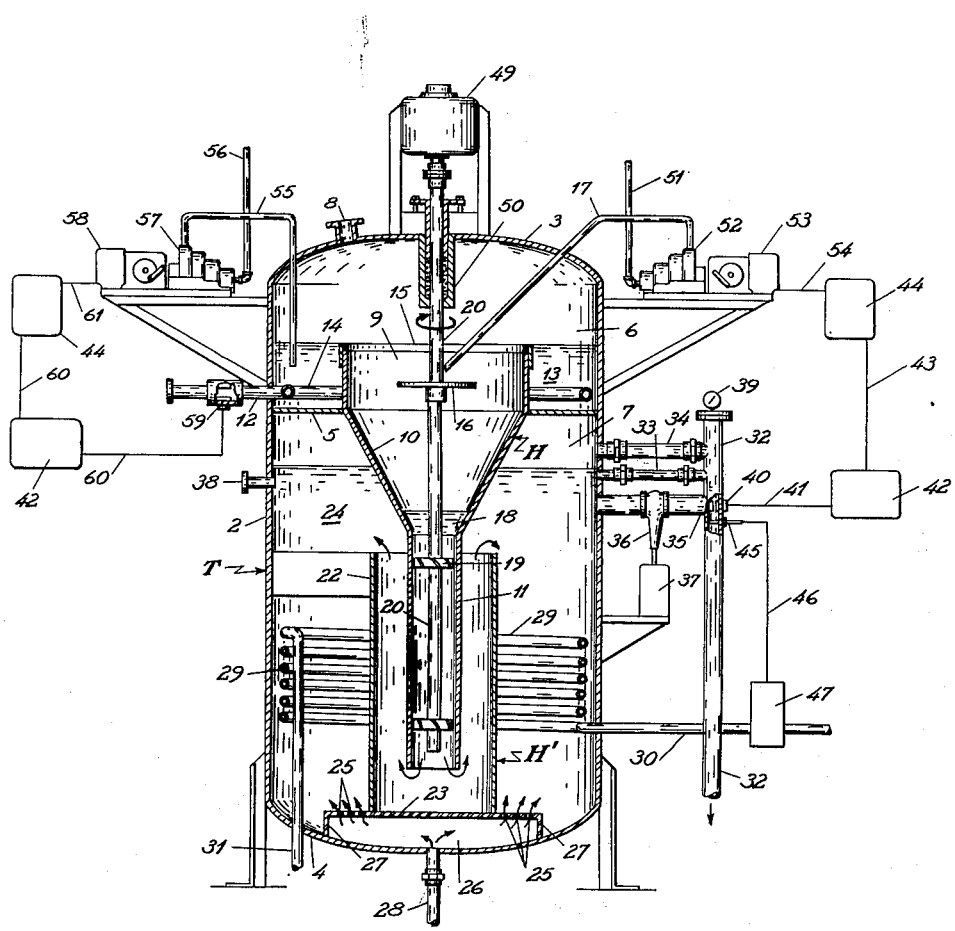
CLARENCE LYNN PETERSON
INVENTOR.
BY
*H. A. McGrew*
ATTORNEY Patented Sept. 5, 1950

2,520,957

UNITED STATES PATENT OFFICE 2,520,957

METHOD AND APPARATUS FOR TREATING LIQUIDS UNDER VACUUM

C. Lynn Peterson, Salt Lake City, Utah, assignor to Peterson Filters and Engineering Co., Salt Lake City, Utah, a partnership Application October 8, 1945, Serial No. 620,966

22 Claims. (Cl. 127—11)

This invention relates to the treatment of liquids, and more particularly to a method of and apparatus for treating under vacuum liquids such as sugar juices into which one or more reagents are to be introduced.

In the treatment of sugar juices resulting from the crushing of sugar cane, or the extraction by hot water from sliced or divided sugar beet pulp, the raw sugar juice is treated to change the juice from an acid to an alkaline condition, as by the addition of lime or milk of lime. Also, the limed juices are usually carbonated, as by the action of carbon dioxide gas, to precipitate gums and other non-sugars. Heretofore, the addition of lime to sugar juice and also the subsequent (or more often at least partially concurrent) carbonation of the juice has been carried out under atmospheric pressure, and substantially by hand control. It has been customary to add predetermined amounts of lime to weighed amounts or batches of juice, the amount of lime added to each batch being previously determined by chemical analysis in the laboratory. However, it is difficult to achieve a sufficiently intimate mixture of the lime and juice of a single batch so that the reactive effects of the lime is distributed equally through the juice. Consequently, it has been customary to introduce successive batches of juice and lime from measuring tanks into a reaction tank, to continuously stir the juice and lime during passage through the tank, and to withdraw the treated juice from the opposite end of the tank. Carbon dioxide gas may be introduced into the tank as a first carbonation step, and the treated juice may then be passed into the second carbonation tower where carbon dioxide only is introduced. Due to the possible slight changes in the acidity or alkalinity of the juice, and also due to the difficulties involved in batches of unequal weight, it is difficult, if not impossible, to control automatically the addition of lime and gas to the juice. Also, it has previously been thought impossible to introduce the lime while a vacuum is maintained on the juice, since it is difficult to produce the desired mixing, and at the same time remove the treated juice from the treating tank without withdrawing also a greater or lesser amount of untreated juice.

Among the objects of this invention are to provide a method of treating liquids in which a non-gaseous and/or gaseous reagent is introduced and mixed with the liquid while under vacuum; to provide such a method in which the introduction of the non-gaseous reagent may be controlled automatically; to provide such a method by which lime may be added continuously to sugar juice and the amount of lime controlled in accordance with the pH of the treated juice; to provide such a method by which carbonation may be accomplished after the addition of lime and also under vacuum; to provide apparatus for carrying out the above method; to provide apparatus in which a non-gaseous reagent is effectively introduced into a liquid under vacuum; to provide such apparatus in which there is a positive movement of liquid out of a vacuum zone; to provide such apparatus which includes a tank; the interior of which may be maintained under vacuum; to provide such apparatus in which impetus for moving liquid away from the initial reaction zone, and impetus for distributing the reagent to the liquid, is obtained from the same source; to provide apparatus for treating sugar juice in which the juice may be introduced into a vacuum tank and controlled amounts of lime or milk of lime added thereto, and further treatment with a gaseous reagent such as carbon dioxide may be expeditiously accomplished; to provide such apparatus which is substantially automatic in operation, and requires relatively few moving parts; and to provide such apparatus which is dependable and economical in operation.

The above and other objects, and the novel features of this invention, will become apparent from the description which follows:

In accordance with this invention, a liquid is treated by establishing a vacuum zone, introducing a body of liquid to be treated into the vacuum zone, effecting a flow of liquid from the body downwardly along a peripherally extending path at least a portion of which converges downwardly, establishing an agitation and mixing zone at the lower end of the path, discharging by centrifugal force a non-gaseous reagent at the upper end of the path, and effecting a flow of liquid upwardly from the lower end of the agitation zone. If desired, an additional vacuum zone may be established into which the liquid overflows and a gaseous reagent is introduced in such vacuum zone. Preferably, the amount of non-gaseous reagent is controlled in accordance with the condition in or discharge from the additional vacuum zone, or in accordance with the condition of incoming material, or both.

In the treatment of sugar juice, the non-gaseous reagent preferably comprises lime, milk of lime, or a solution formed by treating a liquid carrying saccharate values with burned lime or CaO in a Steffens house or similar portion of the refinery, so as to reintroduce such saccharate values into the main sugar recovery circuit. The gaseous reagent preferably comprises carbon dioxide gas, and is introduced by being bubbled upwardly through a body of limed juice in an additional vacuum zone, preferably lower than the initial vacuum zone. The amount of lime added by centrifugal force is preferably controlled automatically in accordance with the acidity or pH value of the juice discharged from the terminal or second vacuum zone. Also, a preliminary amount of lime may be added to the body of juice in the upper or initial vacuum zone, as in the case of a particularly acid juice, and the amount of preliminary lime so added is preferably controlled in accordance with the acidity or pH value of the juice as introduced initially.

The advantages of introducing non-gaseous and gaseous reagents under vacuum are numerous. For instance, in the treatment of sugar juice, the diffusion of the lime into the sugar juice is more rapid and may be carried out at a lower temperature, which is generally true of the diffusion of non-gaseous reagents into a liquid to be treated. Also, the flow of gaseous reagent is more uniform and positive, and carbon dioxide, for instance, withdrawn from a lime kiln to treat sugar juice, will flow more readily from the kiln so that the forced or induced draft in the kiln may be reduced. A greater proportion of the gaseous reagent is also available for the reaction with the liquid, since reacted portions of the liquid will not hold as much of the gas in solution. Furthermore, particularly in the treatment of beet sugar solutions formed by water, a portion of the water vapor tends to pass off, thereby increasing the relative sugar content of the solution and reducing the amount of liquid to be treated subsequently.

Apparatus particularly adapted to carry out the above method may be constructed as illustrated in the accompanying drawing, which is a diagrammatic elevation of a sugar juice limer and carbonator.

The apparatus illustrated in the drawing includes a tank T comprising a cylindrical shell 2 and top and bottom discs 3 and 4, respectively, attached to shell 2 in a suitable manner, as by welding. Tank T is provided with a partition 5 dividing the tank into an upper vacuum compartment or zone 6 and a lower vacuum compartment or zone 7, the vacuum preferably being maintained by a suitable evacuator (not shown) connected with a vacuum connection 8. A substantially tubular or peripheral housing H, which extends vertically through the partition 5, provides communication between the upper and lower compartments, and preferably consists of an upper cylindrical section 9, an intermediate frustro-conical section 10, which converges downwardly, and a lower cylindrical section 11 of reduced cross-sectional area, i. e., having a lesser cross-sectional area than the upper section 9. Liquid, such as raw sugar juice, may be introduced into the upper vacuum zone 6 through an inlet 12 and fed to a body 13 of juice by a coil 14 having spaced holes or apertures for distributing the liquid equally around the space between section 9 of housing H and the wall of tank T. The liquid of body 13 overflows an adjustable lip 15 of the upper housing section, and flows downwardly in a thin film along the inside of housing H. Lime is introduced into the film of liquid, preferably by centrifugal force imparted by a rotating disc 16 supplied by a feed pipe 17. The downwardly converging section 10 of the housing collects the juice and delivers the same to a body 18 maintained in the lower section 11 of reduced cross-sectional area.

An agitation and mixing zone is established in the lower section 11 of the housing, so that the juice and lime will be more thoroughly intermixed, and the juice will be forced away from the upper vacuum zone by the force of gravity and by the pumping action of a pair of impellers 19, preferably having turbine-type blades and attached for rotation to a vertical shaft 20 to which disc 16 is also attached. As will be evident, the combination of gravitational and pumping forces permits the vacuum in upper zone 6 to be maintained, without drawing previously treated juice back up through the housing, since only a film of liquid, rather than a body thereof, is maintained in the upper portion of housing H, whose peripheral shape provides sufficient surface to accommodate the film. Housing H is, of course, preferably tubular so that any transverse section will be a circle, but any other suitable shape may be utilized, such as elliptical, polygonal, semi-circular, or otherwise less than a complete enclosed figure. Thus, as used herein, the term "peripheral" has perhaps slightly more its anatomical rather than geometrical meaning, i. e., distant from the center, and is intended to include any surface which provides a relatively large area down which a film may flow.

To assist in maintaining the body of juice in the agitation zone, and for further mixing the lime and juice, a second housing H' may be disposed in the lower compartment 7. This second housing may include a cylinder 22 surrounding and disposed in spaced relation to the lower section 11 of housing H. The top of the second housing is preferably open, but a bottom plate 23 thereof is spaced from the lower end of housing H, and also preferably spaced from bottom disc 3 of tank T. Juice passing into the lower vacuum zone 7 from housing H' forms a body 24, which may be treated by a gaseous reagent, such as carbon dioxide gas, to precipitate gums and other non-sugars. For this purpose, the bottom plate 23 of housing H' preferably extends radially beyond cylinder 22, and such extending portion is provided with a plurality of holes or apertures 25, through which carbon dioxide is bubbled up through the liquid in the lower vacuum zone. To provide a gas chamber 26, a ring 27 may be attached, as by welding, to the bottom plate 23 of housing H' and also to bottom disc 4 of tank T, while gas may be supplied to chamber 26 through a pipe 28. Also, if desired, the body of juice in the lower compartment may be heated by coils 29, to which a suitable heating medium, such as steam, may be supplied through an inlet 30 and condensate discharged through an outlet 31.

The treated juice is discharged from the tank through an outlet pipe 32, which is connected to the lower vacuum zone 7 by a normal level discharge pipe 33, by a gas or vapor pressure equalizing connection 34 above the normal level of liquid in vacuum zone 7, and by an auxiliary discharge pipe 35. Flow through the auxiliary discharge pipe is controlled by a valve 36 operable by a remote controlled motor 37, and such pipe is utilized principally when a portion of the treated liquid is recirculated to the gaseous treatment or lower vacuum zone 7, as by suitable pumps (not shown) connected to a recirculation inlet 38 on the opposite side of the tank from the discharge pipes.

Outlet pipe 32 may be provided at its upper end with a vacuum gage 39, and below the normal discharge pipe 33 with a liquid condition indicating element, such as an electrical resistance unit 40 adapted to measure the pH value of the treated sugar juice. The electrical resistance unit 40 is connected by wiring 41 with a Wheatstone bridge type of pH meter 42, in turn connected by wiring 43 with an electronic cell motor control 44 for regulating the amount of lime introduced into the raw juice. In addition, outlet pipe 32 may be provided with a thermostatic element 45 connected by wiring 46 with an automatically controlled valve 47 in steam inlet 30 for controlling the amount of steam supplied coils 29 in accordance with the temperature of the treated juice.

Normally, the level of liquid in the lower vacuum zone is maintained just above normal discharge pipe 33, and a vacuum will always exist in the outlet pipe so that the reading of vacuum gage 39 will indicate the degree of vacuum in the lower zone 7. Also, the outlet pipe may lead to a suitable vacuum seal, and/or a pump or the like for delivering the treated juice to the next step in the treatment, such as a filter wherein the precipitated gums and other non-sugars may be removed. However, particularly when carbonating sugar juice containing an abnormal amount of gums and/or other non-sugars, it may prove desirable to recirculate a portion of the treated liquid so as to insure more complete carbonation, as from pipe 32 to recirculation inlet 38. When so recirculating, it will usually be found desirable to provide additional discharge through pipe 35 by opening valve 36, and controlling the amount of juice flowing through pipe 35 in accordance with the amount of juice returned to recirculation inlet 38. When recirculating, a separate pump may be connected with outlet pipe 32 or the seal therefor, or a portion of the discharge from the regular pump returned to the recirculation inlet 38. It will be understood, of course, that the vertical position of recirculation inlet 38 may be varied, and that it is preferably, but not necessarily, on the opposite side of the tank from the discharge pipes leading to outlet pipe 32.

As indicated previously, sugar juice flows in a thin film down the upper cylindrical portion of the housing H and lime is discharged centrifugally from disc 16, which is rotated at any suitable speed, the lime being fed thereon by pipe 17 which terminates at a point just above the disc, and as near the center thereof so that the lime will be deposited on a slower moving portion of the disc. In the treatment of sugar juice, milk of lime, rather than dry lime, is preferably utilized, the milk of lime thus being a liquid reagent which is thrown off the disc and dispersed widely about the circumference of the housing H. An intimate contact between the milk of lime and raw juice is thereby obtained, so that the change from acid to alkaline condition is substantially uniform throughout the body of juice, particularly when the foregoing introduction of lime is succeeded by the mixing in the lower portion of housing H and in housing H'. Shaft 20 may be rotated in a suitable manner, as by a motor 49, mounted on the top disc 3 of the tank, a packing gland 50 providing a seal for the shaft at the point at which it passes through the tank. Motor 49 also furnishes the motive power for rotating the impellers 19, so that impetus for removing liquid from the vacuum zone and for introducing a non-gaseous reagent into the liquid is derived from the same source.

In general, any type of impeller may be utilized, but the turbine type is preferable because the preferred speed of rotation thereof more nearly coincides with the suitable speeds for disc 16 and also because of the equalized radial thrust and consequent tendency to maintain shaft 20 in alignment. Thus, the lower end of the shaft may be free, as shown, but a bearing may be provided, if desired, at the lower end of the shaft.

The vertical distance between the impellers 19 is preferably such that there is sufficient space between the upper and lower impellers to provide some mixing between the impellers, but in general the upper impeller pushes the liquid down to the lower impeller and the lower impeller pushes the liquid out of housing H and up through housing H'. Also, only one impeller may be found sufficient in certain instances, but two impellers, as shown, will generally be found more satisfactory, although additional impellers may be utilized, if desired.

For controlling the rate of feed of lime through pipe 17 from a lime inlet 51, any suitable feed regulation device may be utilized, but it is preferred to utilize a feed device which may be controlled in accordance with a condition of the discharged liquid, such as the pH value. A suitable device for this purpose is a proportioner step valve 52 driven by a variable speed motor 53, since the speed of motor 53 may be determined through electronic cell motor control 44, connected thereto by wiring 54. Since motor control 44 is, in turn, controlled by pH meter 42, in turn responsive to resistance unit 40, and the amount of lime supplied by the step valve will vary in accordance with the speed of the motor, the amount of lime discharged onto disc 16 will vary in accordance with the pH value of the sugar juice discharged from the lower compartment. Such control is effective whether carbonation is being carried out or not, since if there is any tendency for $CO_2$ gas not used in precipitating gums and the like to lessen the alkalinity of the sugar juice, the proportioning valve will merely cause more lime to be fed into the juice, thereby overcoming the acidifying effect of excess $CO_2$ gas, and maintaining the condition of the treated juice at a desired value. Also, when the juice is not being carbonated, the valve and control device will act in the same way to maintain the pH value of the treated juice.

In some instances, it may be found desirable to introduce a portion of the lime into liquid body 13 in the upper compartment, as through a lime discharge pipe 55, which may be supplied from a lime inlet 56 through an additional proportioner valve 57. Valve 57 may be driven by a variable speed motor 58, the speed of which is controlled in accordance with the pH value of the incoming or raw juice, in substantially the same manner as before. Thus, an electrical resistance unit 59 in raw juice inlet 12 may be connected with a second pH meter 42 by wiring 60, the pH meter 42 being connected with a second electronic cell motor control unit 44 and motor 58 by wiring 61. The addition of lime into the body of liquid in the vacuum zone may be desirable when a relatively acid juice is to be treated, or when intensive carbonation is carried out, such as due to a relatively large amount of impurities to be precipitated.

To recapitulate, in general, the sugar juice is introduced into upper compartment 6 and flows downwardly in a thin film along the interior surface of housing H, the lime there being introduced. The juice collects in the lower cylindrical section of the housing, the level of juice normally being maintained within the converging or intermediate section of the housing. From the lower section of the housing, the juice is further mixed and also pumped through the space between the housing H and the second housing H' and into lower compartment 7. In the lower compartment, the juice may be carbonated, if desired, and the treated juice is then discharged through outlet pipe 32.

The combination of the lime introduction at the top of the housing with the establishment of an agitation and mixing zone in the lower section of the housing, of reduced cross-sectional area, is an important feature of this invention, since the successful introduction of lime into sugare juice in a vacuum tank is thereby accomplished. Also, the second housing H', in combination with the heating coils 29, produces a circulation within the lower compartment which assists materially in rendering more effective the carbonation step. Furthermore, the passage of mixed lime and juice downwardly through the agitation zone, and the forcing thereof into the bottom of the second housing H', and then upwardly, insures a thorough mixing of the lime and juice, thus increasing the uniformity of liming or defecation.

By utilizing the process and apparatus herein described, a substantial reduction in the amount of calcium oxide required to treat a given quantity of sugar beets will be obtained. The actual reduction will vary somewhat from plant to plant. In general, however, operators of sugar beet plants calculate their calcium oxide requirements as $1\frac{1}{2}$-$2\frac{1}{2}\%$ of the weight of the beets to be treated. By comparison, the same juice when treated by my process and apparatus actually requires only about $\frac{1}{10}$ of 1% calcium oxide based on the weight of the beets treated. Obviously, therefore, a substantial savings in the cost of reagent is realized.

Although this invention has been described in connection with the treatment of sugar juice with or without carbonation, it will be understood that the method and apparatus of this invention are applicable to the treatment of other liquids, such as the introduction of a conditioning agent into ore pulp, or other treatments wherein a nongaseous reagent is introduced into the liquid under vacuum, and is to be mixed thoroughly therewith. Also, the method and apparatus of this invention are useful in other treatments wherein further treatment by a gaseous reagent is desired.

It will be understood, of course, that various changes may be made in the method and apparatus of this invention. For instance, the amount of non-gaseous reagent introduced may be controlled in accordance with another condition of the treated liquid, such as the density or specific gravity; different types of impellers may be utilized; and the construction and arrangement of parts may differ from those illustrated. It will be further understood that other changes may be made without departing from the spirit and scope of this invention.

What is claimed is:

1. In vacuum apparatus for treating liquids, a tank; a vacuum connection for maintaining a vacuum in said tank; a partition in said tank providing upper and lower compartments; a housing extending through said partition and having a central section of downwardly decreasing cross-sectional area, said housing providing a substantially vertical passage leading from the upper compartment to the lower compartment; a reagent distributor in the upper section of said passage; and an agitating impeller in the lower section of said passage.

2. In vacuum apparatus for treating liquids, a tank; a vacuum connection for maintaining a vacuum in said tank; a partition in said tank providing upper and lower compartments; a housing having a circular upper section and a lower section extending above said partition and a lower section of reduced cross-sectional area, said housing providing a vertical passage leading from the upper compartment to the lower compartment; a rotating disc providing a centrifugal reagent distributor in the upper section of said housing; means for supplying reagent to said disc; and an agitating impeller in the lower section of said housing for moving liquid downwardly in said passage.

3. In vacuum apparatus for treating sugar juice, a tank; a connection for maintaining a vacuum in said tank; a partition in said tank providing upper and lower compartments; a housing extending through said partition and having a central portion of downwardly decreasing cross-sectional area, said housing providing a substantially vertical passage leading from the upper compartment to the lower compartment; a reagent distributor in the upper section of said housing; an agitating impeller in the lower section of said housing; a feed device for supplying lime to said reagent feeder; and control means for said feed device responsive to the pH value of treated juice discharged from said lower compartment.

4. In vacuum apparatus for treating liquids, a tank; a connection for maintaining a vacuum in said tank; a partition in said tank providing upper and lower compartments; a housing extending through said partition and having a lower section of reduced cross-sectional area, said housing providing a substantially vertical passage leading from the upper compartment to the lower compartment; a reagent distributor in the upper section of said housing; an adjustable lip on said housing for regulating overflow of liquid from said upper compartment into said passage; means for supplying reagent to said reagent distributor; additional means for supplying reagent to the space between said housing and the inner wall of said tank; and an agitating impeller in the lower section of said housing for moving liquid downwardly therein.

5. Apparatus for treating liquids, comprising a tank; a connection for maintaining a vacuum in said tank, a partition in said closed tank providing upper and lower compartments; means for supplying liquid to be treated to said upper compartment; means for removing treated liquid from said lower compartment, an upright tubular housing open at each end and extending through said partition, said housing having an upper cylindrical section extending into said upper compartment, an intermediate section converging downwardly, and a lower cylindrical section of reduced diameter extending to the lower portion of said lower compartment; a vertical drive shaft extending centrally through said housing; a centrifugal distributor disc attached to said shaft in the upper section of said housing; a non-gaseous reagent discharge pipe terminating above said distributor disc for supplying such reagent to said disc; an agitating impeller attached to said shaft within the lower section of said housing; and a second housing surrounding in spaced relation at least the lower section of said first housing, said second housing having an open upper end and a closed lower end spaced below the lower end of said first housing.

6. Apparatus for treating liquids comprising a tank; a connection for maintaining a vacuum in said tank, a partition in said closed tank providing upper and lower compartments; means for supplying liquid to be treated to said upper compartment; means for removing treated liquid from said lower compartment, an upright tubular housing open at each end and extending through said partition, said housing having an upper cylindrical section extending into said upper compartment, an intermediate section converging downwardly, and a lower cylindrical section of reduced diameter extending to the lower portion of said lower compartment; a vertical drive shaft extending centrally through said housing; a centrifugal distributor disc attached to said shaft in the upper section of said housing; a non-gaseous reagent discharge pipe terminating above said distributor disc for supplying such reagent to said disc; an agitating impeller attached to said shaft within the lower section of said housing; a second housing surrounding in spaced relation at least the lower section of said first housing, said second housing having an open upper end and a closed lower end spaced from the lower end of said first housing, and also from the bottom of said tank; partition means cooperating with the closed lower end of said second housing to form a gas receiving chamber, said partition means extending outwardly from said second housing and being provided with apertures for introducing a gaseous reagent into the liquid in said lower compartment; and means for supplying such gaseous reagent to the gas receiving chamber.

7. Apparatus for treating sugar juice, comprising a tank; a connection for maintaining a vacuum in said tank, a partition dividing said closed tank into upper and lower compartments; a vertical tubular housing open at each end and extending through said partition, said housing having an upper cylindrical section extending into said upper compartment, an intermediate inverted frustro-conical section, and a lower cylindrical section of reduced diameter extending to the lower portion of said lower compartment; a shaft extending through the top of said tank and centrally through said housing; drive means for said shaft mounted atop said tank; a centrifugal distributor disc attached to said shaft in the upper cylindrical section of said housing; a lime discharge pipe terminating above said distributor disc for supplying lime to said disc; a pair of turbine type impellers attached to said shaft within the lower section of said housing; means for supplying sugar juice to said upper compartment; means for removing treated juice from said lower compartment; an adjustable weir for regulating the overflow of juice from said upper compartment into said housing; a feed device for supplying lime to said lime discharge pipe; control means for said feed device responsive to the pH value of treated juice discharged from said lower compartment; a lime discharge pipe terminating in the juice in the upper compartment; a second feed device for supplying lime to said pipe; control means for said second feed device responsive to the pH value of juice of said upper compartment; a second housing surrounding in spaced relation the lower section of said first housing, said second housing having an open upper end and a closed lower end spaced from the lower end of said first housing, and also from the bottom of said tank, the lower end of said second housing extending outwardly from the remainder of said housing and such outwardly extending portion being provided with a plurality of apertures; means connecting the outer edges of the lower end of said second housing with said tank to form a gas chamber; means for supplying gaseous carbon dioxide to said chamber, for carbonating liquid passing into said lower compartment from said second housing; means for circulating juice from one portion of said lower compartment externally of said tank to another portion of said lower compartment; heating coils in said lower compartment; a valve for steam admitted to said heating coils; and control means for said valve responsive to the temperature of juice discharged from said lower compartment.

8. A method for treating sugar juices and the like which comprises the steps of spreading the juice into a thin hollow flowing stream in a zone maintained at a subatmospheric pressure, forcing an alkaline reagent containing liquid in finely divided condition across a space within said zone into the flowing stream, and pumping the resulting mixture from said zone.

9. A method for treating sugar juices and the like which comprises the steps of establishing a zone of sustained subatmospheric pressure, flowing the juice to be treated into the zone, dividing the juice into a thin hollow stream, introducing a fluid suspension of lime into the zone, forcing the suspension in finely divided form across a space within the zone into the flowing juice stream, collecting the resultant mixture into a solid stream and pumping the solid stream from said zone.

10. A method for treating sugar juices and the like which comprises the steps of establishing a zone of sustained subatmospheric pressure, continuously introducing the juice to be treated into said zone, flowing the juice downwardly in a thin hollow stream within the zone, introducing a fluid suspension of lime into the zone to a point within said hollow stream, throwing the fluid suspension in finely divided form across a space into the hollow stream of juice by centrifugal force, collecting the resultant mixture and continuously agitating and pumping said mixture from said zone.

11. A method for treating sugar juices and the like which comprises the steps of establishing a zone of sustained subatmospheric pressure, introducing the juice to be treated into said zone, dividing the juice into a thin hollop stream converging downwardly into a solid stream, conveying an alkaline reagent into said zone to a point within the hollow stream, forcing said reagent in finely divided form from said point across a space into the hollow juice stream, agitating the resulting mixture after the formation of said solid stream, pumping the agitated mixture from said zone and subsequently treating the mixture with a gas.

12. The process of claim 11 wherein the reagent is a suspension of hydrated lime and water and the gas includes carbon dioxide.

13. The process for removing nitrogenous impurities from raw sugar juice and the like which includes the steps of creating a zone of subatmospheric pressure, forming a thin stream of flowing juice within said zone and introducing an alkaline calcium compound in a dispersed state into the thin stream of juice to precipitate the nitrogenous compounds.

14. The process for removing nitrogenous impurities from raw sugar juice which includes the steps of creating a zone of subatmospheric pressure, forming a thin flowing stream of juice within said zone, introducing a spray of an alkaline reagent into the stream of juice, and varying the amount of reagent introduced into the stream in inverse ratio to the pH value of the juice.

15. Apparatus for treating sugar juice and the like comprising a sealed container having a juice inlet and a juice outlet, means for maintaining a subatmospheric pressure within the container, a centrally disposed, generally vertical housing within the container having side walls and a bottom outlet, means for flowing juice downward within the housing along the side walls in a thin hollow stream, a reagent distributor within the housing spaced from the stream, means including an opening in the sealed container for conveying reagent to the reagent distributor and agitating means within the container for further mixing the reagent with the juice.

16. Apparatus for treating sugar juice and the like comprising a sealed container having a juice inlet and a juice outlet, means for maintaining a subatmospheric pressure within the container, a centrally disposed housing within the container having an open top, side walls and a depending neck, means for flowing juice over the upper rim of the housing downwardly along the side walls in a thin hollow stream, a rotatable reagent distributor within the housing spaced from the stream, means including an opening in the sealed container for conveying reagent to the reagent distributor and agitating means rotatably disposed within said neck.

17. Apparatus for treating sugar juice and the like comprising a sealed container having a juice inlet and a juice outlet, means for maintaining a subatmospheric pressure within the container, a substantially vertical housing centrally disposed within the container having side walls and a depending neck, means for flowing juice downwardly within the housing along the side walls in a thin hollow stream, a rotatable member disposed within the housing and spaced from the side walls, means for conveying a quantity of reagent to the rotatable member for delivery in a dispersed condition to the hollow stream by centrifugal force and an impeller in the neck coupled to the rotatable member for forcing juice downwardly from said housing.

18. Apparatus for treating sugar juice and the like comprising a housing having side walls, a conduit sealed to the lower portion of the housing, means for flowing juice in a thin hollow stream downwardly along the side walls into the conduit, means for maintaining a subatmospheric pressure in the housing, a reagent distributor disposed within the housing spaced from the side walls for forcibly throwing reagent into the thin hollow stream of juice; and pumping means for drawing treated juice downwardly through the conduit.

19. The method for treating sugar juices and the like which includes the steps of flowing untreated juice into a zone of subatmospheric pressure, mechanically agitating the juice while in the zone and simultaneously adding a liquid reagent containing calcium hydroxide to the juice while maintaining said subatmospheric pressure.

20. The method for treating sugar juices and the like which includes the steps of flowing the juice to be treated into a zone, maintaining said zone at a subatmospheric pressure, passing the juice through a housing within the zone, adding a liquid reagent containing calcium hydroxide to the juice while passing through the housing, violently agitating the resultant mixture within the housing and discharging the mixture after agitation from said zone.

21. The process described in claim 20 wherein the flow of juice through said zone is continuous.

22. The process for treating raw sugar juice and the like which includes the steps of flowing the juice to be treated through a zone maintained at a subatmospheric pressure, forcing the juice while within the zone to flow through a desired course, adding a reagent containing lime to the juice while flowing through said course and mechanically agitating and driving the juice in a direction tending to assist the flow of juice along said course.

C. LYNN PETERSON.

REFERENCES CITED

The following references are of record in the file of this patent:

UNITED STATES PATENTS

| Number | Name | Date |
| --- | --- | --- |
| 924,592 | Steynis | June 8, 1909 |
| 1,573,733 | Morse | Feb. 16, 1926 |
| 1,941,461 | Bull | Jan. 2, 1934 |
| 1,956,741 | Hornsberger | May 1, 1934 |
| 2,016,609 | Meredith | Oct. 8, 1935 |
| 2,042,724 | Meredith | June 2, 1936 |
| 2,236,419 | Benning | Mar. 25, 1941 |
| 2,336,199 | Swan | Dec. 7, 1943 |
| 2,405,315 | McBride | Aug. 6, 1946 |